United States Patent Office

3,580,972
Patented May 25, 1971

3,580,972
COATING COMPOSITION OF A MIXTURE OF A VINYL ESTER OF AN ALIPHATIC ACID-CARBOXYLIC ACID COPOLYMER AND A TERPOLYMER OF A VINYL ESTER OF AN ALIPHATIC ACID, A CARBOXYLIC ACID ESTER AND A CARBOXYLIC ACID
Robert A. Isaksen, Longmeadow, and Robert V. De Shay, East Longmeadow, Mass., assignors to Monsanto Company, St. Louis, Mo.
No Drawing. Continuation-in-part of application Ser. No. 617,453, Feb. 21, 1967. This application Aug. 7, 1969, Ser. No. 848,354
Int. Cl. C08g *45/04*; C08f *29/50*
U.S. Cl. 260—836    12 Claims

ABSTRACT OF THE DISCLOSURE

A first interpolymer of 0.5 to 10 mol percent of an ethylenically unsaturated mono- or poly-carboxylic acid and 99.5 to 90 mol percent of a vinylidene ester of a saturated aliphatic acid is blended with a second interpolymer which acts as a polymeric plasticizer. Preferably, the first interpolymer is a copolymer of vinyl acetate and crotonic acid. The second interpolymer is comprised of 75 to 95 mol percent of a vinylidene ester of a saturated aliphatic acid (principally vinyl acetate), 5 to 25 mol percent of an ethylenically unsaturated mono- or poly-carboxylic acid having at least 75% of its carboxylic acid groups esterified with an aliphatic alcohol (principally dibutyl maleate), 0.5 to 10 mol percent of an ethylenically unsaturated mono- or poly-carboxylic acid (principally acrylic acid), and, optionally, zero to 3 mol percent of a glycidyl ester of an ethylenically unsaturated mono- or poly-carboxylic acid (principally glycidyl methacrylate). The interpolymer blend is useful for the protection of materials having at least one finished surface. When no longer needed, it may be removed from the substrate by washing with an aqueous alkaline solution.

BACKGROUND OF THE INVENTION

Related application

This is a continuation-in-part of copending application Ser. No. 617,453, filed Feb. 21, 1967, now abandoned.

Field of the invention

The present invention relates to polymeric organic coatings of increased flexibility and improved toughness over a relatively broad temperature range which may be used for the protection of various substrates and which may subsequently be removed by washing with an aqueous alkaline solvent.

Description of the prior art

The post-forming of pre-finished sheets of various materials has become an important industrial process. In this process the product of one manufacturer is generally in the form of a sheet having at least one surface in a finished condition. The sheets are then transferred to another manufacturer who, by various mechanical means such as high pressure stamping, forms them into more useful shapes. Problems have arisen with regard to the protection of the finished surface of the sheet during this mechanically severe post-forming operation.

In another area, the use of pre-finished materials in the building industry has become widespread in recent years. Problems have arisen, however, with regard to protecting the finished surfaces from the time they leave the factory until they are in place at the job site. In transit and during construction they are continually subjected to impact, abrasion, contamination of various kinds and the corrosive effects of weather, resulting in the need for expensive and time consuming repairs at the site or rejection of the workpiece as being unfit for use. The alleviation of these problems by the use of various types of protective coatings has been the subject of much research. Ordinary paints and varnishes are unsuitable, of course, because the stringent means which must be utilized to remove them would also attack and deface the underlying finished surface which was to be protected. Various "strippable" coatings—i.e., those which may, after application and drying, be peeled off the substrate easily in one continuous sheet—have also been proposed. Prohibitive costs have, however, limited their application. A more practical solution has been the use of coatings which can be removed by washing. Ordinary water soluble polymers would, of course, be unsuitable since they could not withstand outdoor exposure in wet weather. Consequently, it has been necessary to provide coatings which are water insoluble as applied, but which may, by some simple treatment, be water-sensitized, i.e., made soluble or dispersible in water. Such a coating is disclosed in U.S. 3,063,873. Fundamentally, the resins involved are interpolymers in which at least one of the components is derived from a monomer having a carboxylic acid group. Film removal is then achieved by washing with aqueous alkali forming the water soluble salt of the acid. Widespread use of this type of coating has been hampered, however, by deficiencies in physical properties such as impact strength, tensile strength, abrasion resistance, etc., particularly under conditions of extreme outdoor temperatures or severe mechanical handling. In particular, these alkali soluble resins have exhibited a relatively sharp glass transition. This is to say, the change from tough flexible rubberiness to easily-shattered, brittle glassiness occurs over a relatively narrow temperature range. Addition of ordinary plasticizers does not serve to broaden this range but, rather, merely shifts the transition to a lower temperature. For the above mentioned applications, particularly the post-forming operations, a coating is needed in which the transition to the glassy state is as gradual as possible with decreasing temperature.

SUMMARY

According to the present invention, a water-insoluble interpolymer containing acid groups is blended with another interpolymer having the facility of synergistically lowering the glass transition temperature and concurrently broadening the temperature range over which the transition occurs. This second resin may be considered to be a polymeric plasticizer which adds strength and toughness to the blend and does not "bleed out" over a period of time. The polymeric plasticizer has a glass transition temperature which is lower than that of the other interpolymer in the blend. It was expected that the resulting blend would have a glass transition temperature somewhere intermediate between those of the component interpolymers. It was with great surprise, then, that it was discovered that the glass transition temperature of the blend was, in fact, lower than the glass transition temperature of either of the components. Furthermore, the temperature range over which the transition occurs in the blend is substantially broader than the ranges of the components.

By "glass transition" is meant that temperature over which a soft rubbery polymer or interpolymer becomes glassy and brittle with decreasing temperature. Generally, as the temperature is raised above the glass transition temperature, resins become softer and softer, culminating in melts, if not decomposition. Concurrent with this softening of the polymer, a tendency toward increased tackiness arises. Unfortunately, a high degree of adhesiveness is detrimental to the ends sought to be achieved by the present invention in that it would lead to a diminution of the ease with which the coating could be removed from the substrate when no longer needed. It was found, however, that the blend of the present invention exhibited not only the unexpected and advantageous synergistic effect referred to above but also served to delay the onset of this softening process thereby rendering the material useful at increased as well as decreased temperatures.

More particularly, the present invention relates to an aqueous alkali soluble or dispersible coating composition and the method by which it may be used to protect the finished surface or surfaces of materials having at least one surface thereof in a finished condition; wherein the coating composition is comprised of a blend of:

(a) 50–95% by weight of a first interpolymer comprising:
   (1) about 0.5 mol percent to about 10 mol percent of an ethylenically unsaturated mono- or poly-carboxylic acid containing 3 to 6 carbon atoms, and correspondingly,
   (2) about 99.5 mol percent to about 90 mol percent of a vinylidene ester of a saturated aliphatic acid, said saturated acid containing 1 to 6 carbon atoms; and correspondingly, (b) 50–5% by weight of a second interpolymer comprising:
   (1) about 75 mol percent to about 95 mol percent of a vinylidene ester of a saturated aliphatic acid, said saturated acid containing 1 to 6 carbon atoms,
   (2) about 5 mol percent to about 25 mol percent of an ethylenically unsaturated mono- or poly-carboxylic acid having at least 75% of the carboxylic groups thereof esterified with an aliphatic alcohol containing 1 to 14 carbon atoms,
   (3) about 0.5 mol percent to about 15 mol percent of an ethylenically unsaturated mono- or poly-carboxylic acid containing 3 to 6 carbon atoms, and
   (4) zero to about 3 mol percent of a glycidyl ester of an ethylenically unsaturated mono- or poly-carboxylic acid, the molar percentages of each of components (a) and (b) totalling 100.

If desired, about one part by weight of benzotriazole for every 100 parts by weight of the interpolymer blend may be added to the blend to enhance the adhesion of the coating to certain substrates.

The interpolymers to be blended may be prepared by any of the several well known polymerization methods, such as emulsion, suspension or bulk polymerization. When emulsions are used, mixing may be carried out on them directly; for suspension or bulk polymerized resins, it will usually be necessary to dissolve each component in a mutually satisfactory solvent system in order to facilitate proper blending. It is also essential, of course, that the polymeric plasticizer be at least partially compatible with the primary interpolymer of the system. Both from the point of view of increased toughness at room temperature and from the point of view of having flexibility and strength at low temperatures, it is advantageous to choose a polymeric plasticizer which will lower the glass transition temperature of the blend to the greatest possible extent, bearing in mind the prerequisite of compatibility. The resinous coatings of this invention will thus be useful in protecting a broad spectrum of substrates over a wide range of climatic and working conditions.

It is, therefore, an object of the present invention to provide coatings for the protection of a wide variety of materials having at least one finished surface.

It is a further object of this invention to provide coatings which may be fully removed from their substrates by washing with aqueous alkaline solutions.

It is a further object of this invention to provide coatings based upon polymeric blends having glass transition temperatures at or below room temperature and relatively broad transitional temperature ranges.

It is a further object of this invention to provide coatings which exhibit toughness, flexibility and resistance to manhandling over a broad temperature range.

These and other objects may be readily appreciated by those skilled in the art by reference to the following description of the preferred embodiments.

DESCRIPTION OF THE PREFERRED EMBODIMENTS

The coating composition of this invention comprises a mixture of a first interpolymer with a second interpolymer at least partially compatible with the first and capable of yielding a blend having a glass transition temperature at or below room temperature and a transition over a relatively broad temperature range. The determination of the temperature range over which this transition occurs may be carried out in a number of ways well known in the art, e.g., it may be determined graphically by plotting the heat capacity of the polymer versus temperature. At the glass transition temperature of the unblended interpolymer a sharp change in the slope of the curve will be observed denoting a large, rapid change in heat capacity over a range of only about 10–15 centigrade degrees. By use of the composition of this invention, however, the slope of this part of the curve is substantially diminished, resulting in a transition having a breadth of up to about three times those of the individual unblended interpolymers. What is observed, then, in practice, is a protective coating which not only has greater toughness at ordinary room temperatures, but also retains a greater degree of this toughness as this temperature is decreased.

The first interpolymer is comprised of an organic ethylenically unsaturated carboxylic acid in chemical combination with the vinylidene ester of a saturated aliphatic acid. This first interpolymer is limited to resins that are soluble in aqueous alkali. For ready solubility, it is necessary to use an interpolymer having at least 0.5 mol of unsaturated carboxylic acid for every 99.5 mols of the vinylidene ester. It is preferable, for ease of solution, to limit the saturated organic acid forming the vinylidene ester to one containing from 1 to 6 carbon atoms. Examples of these acids are formic, acetic, propanoic, butanoic, pentanoic, the hexanoic acids, their isomers, and mixtures thereof. For the same reason, the unsaturated acid in this interpolymer is limited to mono- or poly-carboxylic acids containing 3 to 6 carbon atoms. Examples of these acids are acrylic, methacrylic, crotonic, isocrotonic, 3-butenoic, angelic, tiglic, senecioic, hydrosorbic, alpha-methylene butyric, maleic, fumaric, glutaconic, etc. The upper limit of the concentration of the unsaturated acid is about 10 mol percent—above this the interpolymer becomes undesirably water sensitive. From the point of view of optimum adhesion, aqueous alkaline solubility, water insensitivity and convenient polymerization rate, an acid concentration ranging from 3 to 5 mol percent is preferred.

The polymeric plasticizer is an organic interpolymer containing:

(1) 75–95 mol percent of a vinylidene ester of a saturated aliphatic acid, said saturated acid containing 1 to 6 carbon atoms,
(2) 5–25 mol percent of an ethylenically unsaturated mono- or poly-carboxylic acid having at least one carboxylic group thereof esterified with an aliphatic alcohol containing 1 to 14 carbon atoms and
(3) 0.5–15 mol percent of an ethylenically unsaturated mono- or poly-carboxylic acid containing 3 to 6 carbon atoms and
(4) 0–3 mol percent of a glycidyl ester of an ethylenically unsaturated mono- or poly-carboxylic acid.

The total molar percentages of these components equals 100. The saturated acid which forms the vinylidene ester may be formic, acetic, propanoic, butanoic, pentanoic, hexanoic, their isomers, and mixtures thereof. The ethylenically unsaturated mono- or poly-carboxylic acid which forms the ester with the aliphatic alcohol containing 1 to 14 carbon atoms may be acrylic, methacrylic, crotonic, isocrotonic, 3-butenoic, angelic, tiglic, senecioic, hydrosorbic, alpha-methylene butyric, maleic, fumaric, glutaconic, etc. The aliphatic alcohol containing 1 to 14 carbon atoms may be methanol, ethanol, propanol, butanol, pentanol, hexanol, heptanol, octanol, nonanol, decanol, hendecanol, dodecanol, tridecanol, tetradecanol, their isomers, and mixtures thereof. The ethylenically unsaturated mono- or poly-carboxylic acid containing 3 to 6 carbon atoms may be acrylic, methacrylic, crotonic, isocrotonic, 3-butenoic, angelic, tiglic, senecioic, hydrosorbic, alpha-methylene butyric, maleic, fumaric, glutaconic, etc. The ethylenically unsaturated mono- or poly-carboxylic acid which forms the glycidyl ester may also be one of these acids.

The preferred polymeric plasticizer is an organic interpolymer containing 75–95 mol percent vinyl acetate, 5–25 mol percent dibutyl maleate, 0.5–15 mol percent acrylic acid, and 0–3 mol percent glycidyl methacrylate, wherein the total molar percentages of the components equals 100. The inclusion of the long chain ester in the second interpolymer, e.g., dibutyl maleate, is important for purposes of internal plasticization and for broadening the adhesive characteristics of the interpolymer such that it will adhere to a wide variety of substrates, particularly plastics. In order for the ester to perform these functions and to exert any noticeable effect upon the properties of the interpolymer it must be present in a concentration of at least about 25 mol percent. The exact amount of ester included will depend upon the degree of softness and/or adhesiveness desired in the particular application. Above the upper limit of about 50 mol percent long chain ester, the interpolymer will be too soft to be useful under the working conditions normally encountered. The other ester of the polymeric plasticizer, i.e., the vinylidene ester of a saturated aliphatic acid, will be present in quantities dependent upon and correlative to the concentration of the above mentioned long chain ester. This vinylidene ester contributes toughness and additional substrate adherability to the system. The presence of free acid groups in the interpolymer, contributed by the ethylenically unsaturated mono- or poly-carboxylic acid containing 3 to 6 carbon atoms, is required for the following reasons.

(1) the hardness of the final coating blend is thereby increased,
(2) the adhesion of the system to metallic substrates is enhanced and
(3) the removability of the coating in the presence of aqueous alkali.

Utilization of concentrations higher than about 15 mol percent would, however, tend to produce brittleness and undesirable water sensitivity.

The glycidyl ester of an ethylenically unsaturated mono- or poly-carboxylic acid may also optionally be included in concentrations of up to about 3 mol percent. By virtue of the reactivity of the epoxy group in its pendent chain, the glycidyl ester further contributes to the hardness and adhesiveness of the interpolymer, both by interacting with the molecules of the substrate and by crosslinking the interpolymer itself. Above the concentrations of about 3 mol percent, however, it imparts too great a degree of crosslinking, thereby rendering the system too brittle and solvent insensitive for use. For optimization of the toughness and adhesiveness of the polymeric plasticizer, the most preferred formulation is: vinyl acetate 75–90 mol percent, dibutyl maleate 9–12 mol percent, acrylic acid 2–12 mol percent, glycidyl methacrylate 0–1 mol percent, the total molar percentages equalling 100.

The blended coating composition of this invention contains from 50 to 95 weight percent of the vinylidene ester/ethylenically unsaturated carboxylic acid interpolymer and, correspondingly, from 50 to 5 weight percent of the above described polymeric plasticizer. If the ratio of the first interpolymer to the polymeric plasticizer exceeds 95/5, the desired flexibility will not be achieved; if the ratio drops below 50/50 the material will be too soft to withstand severe mechanical handling. For the optimum combination of flexibility, toughness and controlled adhesion the preferred ranges are 70–90 weight percent carboxylic acid-containing vinylidene ester and correspondingly, 30–10 weight percent polymeric plasticizer.

For initial application to the substrate the interpolymer blend is in solution form. These may be either aqueous solutions or solutions in organic solvents or in many instances water/organic solvent mixtures. To insure solubility of the interpolymer blend when water or a mixture thereof with organic solvent is used, the solution should preferably be rendered alkaline. Preferred organic solvents include, for example, one to three carbon alcohols such as methanol, ethanol, n-propanol and isopropanol, aromatic such as toluene, xylene, etc., and mixtures of such alcohols and aromatics.

The following examples are presented in illustration of the invention and are not intended as limitations thereof. Where parts are mentioned, parts by weight are intended unless otherwise described.

EXAMPLE 1

Eighty-four parts of an interpolymer containing 95 mol percent vinyl acetate and 5 mol percent crotonic acid is dissolved in 196 parts of ethanol. To this solution is added 16 parts of an interpolymer containing 86.6 mol percent vinyl acetate, 11.1 mol percent dibutyl maleate and 2.3 mol percent acrylic acid, dissolved in 13.1 parts of ethanol. The mixture is agitated until uniform. A film about 6 mils thick is cast on a mild steel test panel by means of a doctor blade and air dried overnight. The dry film withstands a reverse impact of 80 inch-pounds as measured by means of a Gardner Impact Tester. It can also be bent 180° over ½ inch, ¼ inch, and ⅛ inch mandrels without breaking. The film is completely removed from the substrate by soaking for three minutes in water containing 2% anionic detergent and enough sodium hydroxide to adjust the pH to pH 11. The temperature of the wash solution is 140° F.

EXAMPLE 2

Seventy parts of an interpolymer containing 95 mol present vinyl acetate and 5 mol percent crotonic acid is dissolved in 163 parts of ethanol. To this solution is added thirty parts of an interpolymer containing 86.6 mol percent vinyl acetate, 11.1 mol percent dibutyl maleate and 2.3 mol percent acrylic acid, dissolved in 24.5 parts of ethanol. The mixture is agitated until uniform. A film about 6 mils thick when wet is cast on a mild steel test panel by means of a doctor blade and dried for two minutes at 100° C. The resulting dry film withstands a reverse impact of 80 inch-pounds and exhibits a "pencil hardness" of "H." The "pencil hardness" test is well known in the art and has been described in Journal of Paint Technology 38, No. 502, 691–694, November 1966. The film is easily removed by the method described in Example 1.

EXAMPLE 3

Another film of the solution blend of Example 2 is cast on a mild steel test panel such that the dry film has a thickness of about 0.4 mil. This film does not crack when the panel is bent at a sharp 90° angle.

EXAMPLE 4

To the solution of Example 2 was added one part benzotriazole. The solution was then applied to test panels of aluminum, copper, brass and chromium plated steel. The panels thus coated underwent 261 hours exposure in the Weatherometer, set for the following cycle: One-half hour at low relative humidity with the ultraviolet lights on; one-half hour at condensing humidity with the ultraviolet lights off, during which time the panel backs are sprayed with cold water to induce the condensation; repeat.

All the films were readily removable in the detergent solution described in Example 1 at 175° F.

EXAMPLE 5

Eightly parts of an interpolymer containing 95 mol percent vinyl acetate and 5 mol percent crotonic acid is dissolved in 187 parts of ethanol. To this solution is added twenty parts of an interpolymer containing 86.6 mol percent vinyl acetate, 11.1 mol percent dibutyl maleate and 2.3 mol percent acrylic acid, dissolved in 16.4 parts of ethanol. The mixture is agitated until uniform. Films are applied to mild steel test panels and dried for ten minutes at 225° F. The resulting dry films withstand a reverse impact of 80 inch-pounds, having a pencil hardness of "H" and exhibit excellent removability.

EXAMPLE 6

By the procedure of Example 5, a film based on a 90/10 interpolymer blend is prepared. The results are the same except that the hardness is increased to "2H."

EXAMPLE 7

Part A

The glass transition of the vinyl acetate/crotonic acid interpolymer of Example 5 was measured by differential thermal analysis. The glass transition temperature was found to be 36° C. and the glass transition region extended over a breadth of eleven centigrade degrees.

Part B

The glass transition of the vinyl acetate/dibutyl maleate/acrylic acid interpolymer of Example 5 was measured by differential thermal analysis. The glass transition temperature was found to be 25° C. and the glass transition region extended over a breadth of sixteen centigrade degrees.

Part C

The glass transition of the interpolymer blend of Example 6 was measured by differential thermal analysis. The glass transition temperature was found to be 18° C. and the breadth of the glass transition region was twenty-one centigrade degrees.

Comparing the data of Part C, which is the material of the present invention, with that of Parts A and B, it is clearly evident that the blending of the two interpolymers according to this invention exerts a synergistic effect on the physical properties of the system which is totally unexpected and unpredictable by comparison of the known properties of the components.

EXAMPLE 8

Eighty-five parts of the vinyl acetate/crotonic acid interpolymer of Example 5 was blended with fifteen parts of the vinyl acetate/dibutyl maleate, acrylic acid interpolymer of Example 5. The glass transition was studied as in Example 7. The glass transition temperature was found to be 13° C. and the breadth of the glass transition region was twenty-six centigrate degrees.

EXAMPLE 9

Fifty parts of the vinyl acetate/crotonic acid interpolymer of Example 5 was blended with fifty parts of the vinyl acetate/dibutyl maleate/acrylic acid interpolymer of Example 5. The glass transition was studied as in Example 7. The glass transition temperature was found to be 15° C. and the breadth of the glass transition region was thirty-one centigrade degrees.

EXAMPLE 10

Seventy parts of an interpolymer containing 97 mol percent vinyl acetate and 3 mol percent crotonic acid is blended with thirty parts of an interpolymer containing 86.6 mol percent vinyl acetate, 11.1 mol percent dibutyl maleate and 2.3 mol percent acrylic acid in the manner described in Example 2. One part benzotriazole is added; films are applied to aluminum, copper brass and chromium plated steel; and aging in the Weatherometer is carried out as in Example 4.

All the films are readily removable in the detergent solution described in Example 1 at 175° F.

EXAMPLE 11

Eighty parts of an interpolymer containing 95 mol percent vinyl acetate and 5 mol percent crotonic acid is dissolved in 187 parts of ethanol. To this solution is added twenty parts of an interpolymer containing 78.3 mol percent vinyl acetate, 9.83 mol percent dibutyl maleate and 11.9 mol percent acrylic acid, dissolved in 16.8 parts of ethanol. The mixture is agitated until uniform. One part benzotriazole is added; films are applied to aluminum, copper, brass and chromium plated steel; and aging in the Weatherometer is carried out as in Example 4.

All the films are readily removable in the detergent solution described in Example 1 at 175° F.

EXAMPLE 12

The interpolymers of Example 11 are mixed in a 50/50 ratio. A film of the blend has a pencil hardness of "H." The other physical properties are equivalent.

EXAMPLE 13

Eighty parts of an interpolymer containing 95 mol percent vinyl acetate and 5 mol percent cotonic acid is dissolved in 187 parts of ethanol. To this solution is added twenty parts of an interpolymer containing 83.2 mol percent vinyl acetate, 10.2 mol percent dibutyl maleate, 5.97 mol percent acrylic acid and 0.704 mol percent glycidyl methacrylate, dissolved in 16.4 parts of ethanol. The mixture is agitated until uniform. Films are applied to mild steel test panels and dried for ten minutes at 225° F. The resulting dry film withstands a reverse impact of 80 inch-pounds, has a pencil hardness of "H" and exhibits excellent removability.

EXAMPLE 14

By the procedure of Example 13, a film based on a 90/10 interpolymer blend is prepared. The results are the same except that the hardness is increased to "5H."

All the films were readily removable in the detergent solution described in Example 1 at 175° F.

Examples 1–14 illustrate the most preferred embodiments of the present invention. The following examples, 15–17, further illustrate the scope contemplated.

EXAMPLE 15

95 parts of an interpolymer containing 99.5 mol percent vinyl acetate and 0.5 mol percent acrylic acid is dissolved in 190 parts of ethanol. To this solution is added 5 parts of an interpolymer containing 80 mol percent vinyl propionate, 12 mol percent di-2-ethyl hexyl acrylate, 5 mol percent acrylic acid, and 3 mol percent glycidyl acrylate, dissolved in 7.5 parts of ethanol. The mixture is agitated until uniform. Films are applied to mild steel test panels and dried for ten minutes at 225° F. The resulting dry film is readily removable in the alkaline detergent solution.

EXAMPLE 16

50 parts of an interpolymer containing 80 mol percent vinyl butyrate and 20 mol percent maleic acid is dissolved in 60 parts of ethanol. To this solution is added 50 parts of an interpolymer containing 75 mol percent vinyl butyrate, 15 mol percent di-dodecyl acrylate, and 15 mol percent acrylic acid, dissolved in 60 parts of ethanol. Films of this blend are removable from mild steel panels in the above described alkaline detergent solution.

EXAMPLE 17

80 parts of an interpolymer containing 95 mol percent vinyl acetate and 5 mol percent fumaric acid is dissolved in 187 parts of ethanol. To this solution is added 20 parts of an interpolymer containing 90 mol percent vinyl acetate, 5 mol percent di-2-ethylhexyl crotonate, and 5 mol percent crotonic acid, dissolved in 17 parts of ethanol. The mixture is agitated until uniform. Films are applied to mild steel test panels and dried for 10 minutes at 225° F. The films are readily removable in the detergent solution described in Example 1.

It is obvious, of course, that various additives such as pigments, dyes, fillers, extenders, wetting agents and the like may be added to these compositions without departing from the scope of this invention. Small quantities of a conventional drier such as the naphthenate of lead, cobalt or manganese, etc. may be employed, if desired, to improve the drying characteristics of films cast from these resins. The films may be employed to protect the finished surfaces of such commercial products as automobiles, appliances, furniture, architectural structures, etc.

Flms of the blends of this invention will adhere to most surfaces, including glass, wood, masonry, plaster, textiles, other resins, asphaltous matrixes, etc., in addition to metals. They possess an unusually attractive blance between the properties of flexibility and hardness, in addition to being resistant to impact.

Applications of the coatings may be accomplished by conventional methods, e.g., brushing, spraying, dipping, etc.

It is obvious that many variations may be made in the products and methods set forth above without departing from the spirit and scope of this invention.

The embodiments of the invention in which an exclusive property or privilege is claimed are defined as follows:

1. A coating composition, which after application and drying is soluble or dispersible in aqueous alkaline solutions, comprising a solution of:
   (a) 50–95% polymer solids by weight of a first interpolymer comprising:
      (1) about 0.5 mol percent to about 10 mol percent of an ethylenically unsaturated mono- or poly-carboxylic acid containing 3 to 6 carbon atoms
      and correspondingly,
      (2) about 99.5 mol percent to about 90 mol percent of a vinylidene ester of a saturated aliphatic acid, said saturated acid containing 1 to 6 carbon atoms,
      and correspondingly,
   (b) 50–5% polymer solids by weight of a second interpolymer comprising:
      (1) about 75 mol percent to about 95 mol percent of a vinylidene ester of a saturated aliphatic acid, said saturated acid containing 1 to 6 carbon atoms,
      (2) about 5 mol percent to about 25 mol percent of an ethylenically unsaturated mono- or poly-carboxylic acid having at least 75% of the carboxylic groups thereof esterified with an aliphatic alcohol containing 1 to 14 carbon atoms,
      (3) about 0.5 mol percent to about 15 mol percent of an ethylenically unsaturated mono- or poly-carboxylic acid containing 3 to 6 carbon atoms and
      (4) zero to about 3 mol percent of a glycidyl ester of an ethylenically unsaturated mono- or poly-carboxylic acid,
   the molar percentages of each of components (a) and (b) totalling 100.

2. The coating composition of claim 1 wherein the first interpolymer is an interpolymer of vinyl acetate and crotonic acid and the second interpolymer is an interpolymer of vinyl acetate, dibutyl maleate, acrylic acid and optionally glycidyl methacrylate.

3. The coating composition of claim 1 further containing about 1 part by weight of benzotriazole for every 100 parts by weight of the interpolymer blend.

4. The coating composition of claim 1 wherein the blend comprises:
   (a) 70–90% by weight of a first interpolymer comprising:
      (1) about 3 mol percent to about 5 mol percent crotonic acid and correspondingly,
      (2) about 97 mol percent to about 95 mol percent vinyl acetate;
   and correspondingly;
   (b) 30–10% by weight of a second interpolymer comprising:
      (1) 75–90 mol percent vinyl acetate,
      (2) 9–12 mol percent dibutyl maleate,
      (3) 2–12 mol percent acrylic acid, and
      (4) 0–1 mol percent glycidyl methacrylate
   the molar percentages of each of components (a) and (b) totalling 100.

5. A method of protecting the finished surface or surfaces of materials having at least one surface thereof in a finished condition which comprises applying thereto a solution of a coating composition comprising a blend of:
   (a) 50–95% polymer solids by weight of a first interpolymer comprising:
      (1) about 0.5 mol percent to about 10 mol percent of an ethylenically unsaturated mono- or poly-carboxylic acid containing 3 to 6 carbon atoms,
      and correspondingly,
      (2) about 99.5 mol percent to about 90 mol percent of a vinylidene ester of a saturated aliphatic acid, said saturated acid containing 1 to 6 carbon atoms;
   and correspondingly,
   (b) 50–5% polymer solids by weight of a second interpolymer comprising:
      (1) about 75 mol percent to about 95 mol percent of a vinylidene ester of a saturated aliphatic acid, said saturated acid containing 1 to 6 carbon atoms,
      (2) about 5 mol percent to about 25 mol percent of an ethylenically unsaturated mono- or poly-carboxylic acid having at least 1 carboxylic group thereof esterified with an aliphatic alcohol containing 1 to 14 carbon atoms,
      (3) about 0.5 mol percent to about 15 mol percent of an ethylenically unsaturated mono- or poly-carboxylic acid containing 3 to 6 carbon atoms and
      (4) 0.3 mol percent of a glycidyl ester of an ethylenically unsaturated mono- or poly-carboxylic acid,
   the molar percentages of each of components (a) and (b) totalling 100.

6. The method of claim 5 wherein the first interpolymer is an interpolymer of vinyl acetate and crotonic acid and the second interpolymer is an interpolymer of vinyl acetate, dibutyl maleate, acrylic acid and optionally glycidyl methacrylate.

7. The method of claim 5 wherein the coating composition further contains about 1 part by weight of benzotriazole for every 100 parts by weight of the interpolymer blend.

8. The method of claim 5 wherein the blend comprises:
   (a) 70–90% by weight of a first interpolymer comprising:
      (1) about 3 mol percent to about 5 mol percent crotonic acid,
      and correspondingly, (2) about 97 mole percent to about 95 mol percent vinyl acetate;

and correspondingly, (b) 30–10% by weight of a second interpolymer comprising:
(1) 75–90 mol percent vinyl acetate,
(2) 9–12 mol percent dibutyl maleate,
(3) 2–12 mol percent acrylic acid, and
(4) 0–1 mol percent glycidyl methacrylate the molar percentages of each of components (a) and (b) totalling 100.

9. A surface having applied thereon a resinous coating of a blend of:
(a) 50–95% polymer solids by weight of a first interpolymer comprising:
(1) about 0.5 mol percent to about 10 mol percent of an ethylenically unsaturated mono- or poly-carboxylic acid containing 3 to 6 carbon atoms and correspondingly,
(2) about 99.5 mol percent to about 90 mol percent of a vinylidene ester of a saturated aliphatic acid, said saturated acid containing 1 to 6 carbon atoms, and correspondingly,
(b) 50–5% polymer solids by weight of a second interpolymer comprising:
(1) about 75 mol percent to about 95 mol percent of a vinylidene ester of a saturated aliphatic acid, said saturated acid containing 1 to 6 carbon atoms,
(2) about 5 mol percent to about 25 mol percent of an ethylenically unsaturated mono- or poly-carboxylic acid having at least 75% of the carboxylic groups thereof esterified with an aliphatic alcohol containing 1 to 14 carbon atoms,
(3) about 0.5 mol percent to about 15 mol percent of an ethylenically unsaturated mono- or poly-carboxylic acid containing 3 to 6 carbon atoms and
(4) zero to about 3 mol percent of a glycidyl ester of an ethylenically unsaturated mono- or poly-carboxylic acid.

the molar percentages of each of components (a) and (b) totaling 100.

10. A surface as in claim 9 wherein the first interpolymer is an interpolymer of vinyl acetate and crotonic acid and the second interpolymer is an interpolymer of vinyl acetate, dibutyl maleate, acrylic acid and optionally glycidyl methacrylate.

11. A surface as in claim 9 wherein the coating further contains about 1 part by weight of benzotriazole for every 100 parts by weight of the interpolymer blend.

12. A surface as in claim 9 wherein the blend comprises:
(a) 70–90% by weight of a first interpolymer comprising:
(1) about 3 mol percent to about 5 mol percent crotonic acid and correspondingly,
(2) about 97 mol percent to about 95 mol percent vinyl acetate;

and correspondingly,
(b) 30–10% by weight of a second interpolymer comprising:
(1) 75–90 mol percent vinyl acetate,
(2) 9–12 mol percent dibutyl maleate,
(3) 2–12 mol percent acrylic acid, and
(4) 0–1 mol percent glycidyl methacrylate the molar percentages of each of components (a) and (b) totalling 100.

References Cited
UNITED STATES PATENTS

| | | | |
|---|---|---|---|
| 2,860,020 | 9/1957 | Scott | 260—29.6 |
| 3,092,600 | 6/1963 | Ozawa | 260—29.6 |
| 3,220,967 | 11/1965 | Terry | 260—901 |
| 3,154,598 | 10/1964 | Vasta | 260—836 |
| 3,297,621 | 1/1967 | Taft | 260—836 |
| 3,316,198 | 4/1967 | Van Gorder | 260—901 |

PAUL LIEBERMAN, Primary Examiner

U.S. Cl. X.R.

260—29.6, 33.4, 33.6, 874, 901; 117—124, 125, 132, 138.8, 148, 161